3,447,947
DRAFTING FILM
Terence A. Abbott, Margaret L. Clachan, David Rankine Kennedy, Ian S. McIntyre, and Basil R. Shephard, Brantham, Manningtree, England, assignors to Bexford Limited, Brantham, Manningtree, England, a British company
No Drawing. Filed Mar. 15, 1965, Ser. No. 439,932
Claims priority, application Great Britain, Mar. 20, 1964, 11,794/64
Int. Cl. C09d 3/64; B44d 1/24; G03c 1/00
U.S. Cl. 117—73                            13 Claims

ABSTRACT OF THE DISCLOSURE

There is provided a translucent polyester film which is receptive to clear legible marking with writing materials which consists of (1) A hydrophobic film of biaxially oriented synthetic linear polyester;
(2) A layer coated directly on the said film and selected from (a) terephthalic-isophthalic polyesters or polyester-amide or polyester oxazoline, (b) polyvinyl halogenoacetate or copolymers thereof, (c) chlorinated polyalkyl acrylates, or methacrylates or copolymers thereof, and (d) a curable epoxy resin;
(3) An outer layer of a film-forming material containing toothing agents.

---

This invention relates to synthetic film materials, and more particularly to flexible translucent coated films for drafting purposes.

It is known that self-supporting films of synthetic linear polyesters, particularly polyethylene terephthalate, may readily be prepared with mechanical, physical and chemical properties which make them very suitable as base materials for the production of translucent coated film for use in drawing offices for tracing or photographic reproduction purposes.

To adapt the self-supporting polyester film for the purpose mentioned, it is known to provide it with a coating of a resinous composition containing inorganic toothing agents and so produce a surface which is suitable for writing on with ink or pencil, or which can subsequently be prepared in such a way that it can be coated with a photographic emulsion or will accept a solution containing a light-sensitive diazonium salt.

However, there is great difficulty in providing adequate anchorage of such coatings to the film base and they have been found to separate from the base in use. If the coating is hard there is a tendency for it to separate when the product is folded or flexed; if the coating is soft or flexible it may separate locally under the influence of a writing implement such as a sharp-pointed pencil.

It is an object of the present invention to provide a new coated synthetic linear polyester film suitable for use in drawing offices for tracing or photographic reproduction purposes, in which the aforementioned tendency of the coating to separate from the base is substantially eliminated.

According to the present invention there is provided a translucent polyester film material which is receptive to clear and legible marking with pencil or ink, consisting of a film of synthetic linear polyester of higher hydrophobic character, having superimposed thereon, on at least one surface, in order:

A. A directly adherent layer consisting essentially of one of the following—
(1) An organic-solvent soluble mixed terephthalic-isophthalic polyester or polyester-amide or polyester oxazoline,
(2) A polyvinyl halogenoacetate or a copolymer of a vinyl halogenoacetate,
(3) A chlorinated polyalkyl acrylate or polyalkyl methacrylate or a chlorinated copolymer of alkyl acrylates and/or alkyl methacrylates,
(4) A curable epoxy resin, and
B. An adherent layer of an organic film-forming organic-solvent-soluble material containing finely divided discrete particles of an inorganic translucence-producing toothing agent or agents.

The film of synthetic linear polyester is preferably a film formed from polyethylene terephthalate, and it is preferably one which has been molecularly oriented by stretching in one or two directions at right angles. Such synthetic linear polyester film materials are readily available commercially.

In regard to the layers referred to above the following are exemplary types:

Organic-solvent soluble polyesters for layer A(1) may be formed from one or more alkylene glycols and may have from 25 to 90% of the ester groups derived from isophthalic acid.

Organic-solvent soluble polyester-amides for layer A(1) may be formed from one or two dicarboxylic acids, including isophthalic or terephthalic combined with one or two alkylene glycols and an alkylene diamine, the latter comprising 5 to 30% of the total molar amount of glycols and diamine.

Organic-solvent soluble polyester-oxazolines for layer A(1) may be formed from one or more dicarboxylic acids, including isophthalic or terephthalic, combined with one or two alkylene glycols and either 4,4-dihydroxymethyl 2-substituted oxazoline-2 or a N-aroyl or N-acyl tris(hydroxymethyl)amino-methane, the oxazoline-2 derivative or the derivative of tris(hydroxymethyl)aminomethane, comprising 5 to 30% of the total molar amount of the glycol and oxazoline constituents.

Soluble polyester-amides or polyester-oxazolines for layer A(1) may have acid radicals derived from isophthalic acid, terephthalic acid, or both optionally with one or more other dicarboxylic acids, e.g., phthalic, sebacic, adipic and succinic or other simple dicarboxylic acids.

Suitable soluble polyesters for layer A(1) are commercially available under the trademarks Vitel PE–200 and Videne. The soluble polyester-amides and polyester-oxazolines may be prepared by well-known melt condensation procedures.

Vinyl halogenoacetate polymers or copolymers for layer A(2) may have halogenoacetate groups derived from mono-, di- or trichloroacetic acid. The vinyl halogenoacetate copolymers may be copolymers of vinylmono-, di- or trichloroacetate with vinyl acetate and/or vinyl alcohol containing between 50–100 mole percent of the vinyl-mono-, di- or trichloracetate.

Polymers and copolymers for layer A(2) may be readily prepared by polymerisation of vinyl halogenoacetate monomer with or without vinyl acetate monomer, optionally followed by hydrolysis to introduce hydroxyl groups. Alternatively, similar products may be made by the direct halogenoacylation of commercial polyvinyl alcohols which may contain a proportion of acetate groups, suitable polyvinyl alcohols being readily available under the trademarks, Alcotex, Moviol and Gelvatol.

The chlorinated polymer or copolymers for layer A(3) preferably have chlorine incorporated to the extent of at least 0.4 degree of substitution per monomer unit. These chlorinated polymers or copolymers may be readily prepared by direct chlorination under UV radiation of aqueous lattices of the appropriate poly- or copoly-(meth-) acrylates or solutions of these in organic solvents.

Curable epoxy resins for layer A(4) are suitably those derived by reaction of a diphenylpropane with epichlorhydrin and which have an epoxy equivalent (g. rosin containing 1 equivalent of epoxide) of 190 to 2,000; suitable resins are readily available under the trade mark Epikote. These epoxy resins may readily be cured by any of the well known curing agents, such as polyakylene polyamines, aromatic polyamines, phenolic polyamines, amine salts, adducts and complexes, and acidic curing agents. They may also be cured by means of a reactive polyamide which is advantageously a condensation product of polymerised linoleic acid with a polyamine of said polyamide, having an amine value of 80 to 400 determined by titration with HCl and expressed as mg. KOH/gm. and which is available under the trademark Versamid. The relative proportions of such polyamide resins with the curable epoxy resin in layer A(4) may vary widely, but generally substantially equal weights are suitable, e.g., within the range 75 to 25% of the one to 25 to 75% of the other.

It is preferred that layers A(1) and A(2) and A(3) should include a cross-linking agent to prevent excessive attack on the layer by solvent media of the subsequently applied layer. The cross-linking agent in layer A(1) may be a tetraalkoxy titanium or tetraalkoxy zirconium. The cross-linking agent in layer A(2) may be a tetraalkoxy titanium, a tetraalkoxy zirconium, formaldehyde, compounds with hydroxymethyl or alkoxymethyl residues and dianhydrides. The cross-linking agent in layer A(3) may be a polyalkylene polyamine or a polyamide resin having free amino groups.

Layers A(1), A(2), A(3) and A(4) should be dried under conditions which will effect partial cross-linking or partial cure in the case of the epoxy resin A(4), e.g., by heating at 60° C. for a few minutes.

Hydrophobic organic film-forming materials for layer B may be selected from one or more of the following: a cellulose ester; an acrylic polymer or copolymer; an organic soluble urea-formaldehyde resin or modified urea-formaldehyde resin; an organic soluble melamine-formaldehyde resin or modified melamine-formaldehyde resin; an alkyd resin; a polyvinyl acetal; a curable epoxy resin; a soluble polyamide resin.

These film-forming materials are preferably used in admixture. For example, a lacquer grade cellulose nitrate may suitably be combined with proportions of a urea-formaldehyde or melamine-formaldehyde resin, together with proportions of an alkyd resin to obtain a balance between flexibility, hardness and mar resistance; a curable epoxy resin may be suitably combined with proportions of an epoxy-reactive polyamide resin.

Finely divided inorganic translucence-producing and toothing agents may, for example, be selected from silica, silicates, ground glass, chalk, talc, diatomaceous earth, magnesium carbonate, zinc oxide and titanium oxide. Finely divided silica of particle size 0.1 to 15 microns is the preferred toothing agent, together with which smaller quantities of the other materials may be incorporated, to obtain the required degree of translucency and to increase the toughness and mar resistance of the coating.

It is preferred that layer B should be baked for a short period at temperatures around 100 to 120° C. to effect cure of partially polymerised constituents.

The material content of layer B is not limited to those so far specified; minor proportions of other constituents may advantageously be added to effect cure and control flexibility of the coating, and to reduce pick up of static electricity by the coated film.

The invention is not limited to the application of layer B directly on top of layer A. An intermediate layer or layers of a film-forming material may advantageously be applied with consequent improvement of adhesion of B to A. For example, when the hydrophobic film-forming material of layer B is essentially nitrocellulose and layer A is a mixed terephthalic-isophthalic polyester, an intermediate layer of nitrocellulose may advantageously be applied on top of layer A before the application of layer B.

Layers A and B may be applied conveniently from volatile organic solvent media by well known coating devices, such as bead coaters, dip coaters or reverse roll coaters. Layer A is preferably applied from solvent media having some slight swelling action on the base and is dried and preferably partially cured or cross-linked by a short period of heating at 60 to 120° C. before layer B is applied. Layer B is preferably applied from solvent media which have limited swelling action on layer A or any intermediate layer.

The coated synthetic linear polyester film provided by the present invention may be further prepared in such a way that it will accept photographic silver halide emulsions or solutions containing light sensitive diazonium salts, and the final product can then be used photographically and have corrections made by removing the photographic image and drawing in pencil or ink on to the drafting surface.

The following examples will serve to illustrate the invention. In these examples various commercial materials are used and these are as follows:

Paralac 285X, a castor oil alkyd.
Bedacryl 3X, a solution of a drying oil alkyd modified with a polymethacrylic ester.
Paralac 2001, a solution of a modified urea-formaldehyde resin.
Pioneer FM555, a solution of a melamine resin.
Formvar 770, a copolyvinyl formal containing 40 to 50% polyvinyl acetate and 5 to 6.5% polyvinyl alcohol.
Epikote 1001, an epoxy resin with epoxide equivalent 450 to 525 (g. of resin containing one equivalent of epoxide).
Epikote 1004, an epoxy resin with epoxide equivalent 905 to 985.
Versamid 100, a soluble polyamide with an amine value 83 to 93 (mgm. KOH equivalent per g. of resin).
Versamid 115, a soluble polyamide with an amine value 210 to 220.
Gasil 64, a micronised silica of particle size 6 to 14 microns.
Gasil 937, a micronised silica of particle size 6 to 9 microns.
Santocel 54, a silica with an average particle size 0.5 to 3.0 microns.
Runa RH20, rutile titanium oxide.
Tioxide R–CR3, modified titanium oxide.
Texilac W602 DP, a solution of the ammonium salt of an acrylic acid copolymer, supplied together with Catalyst W, a solution of ammonium toluene sulphonate.

In all of the formulae given in the examples, commercial materials which are supplied as solutions, such as Paralac 2001, are quoted as the appropriate quantities of solid constituents; the solvents of the supplied solutions are quoted separately.

The inorganic toothing or translucence-producing agents, Santocel 54 and Runa RH20, were generally dispersed in a concentrate with some of the lacquer constituents by ball milling or attritor milling; the resulting concentrated dispersion was incorporated in the final lacquer by stirring.

Gasil 64 and Tioxide R–CR3 were incorporated in the final lacquer by high speed stirring.

The viscosities of the lacquers which produce the pencil and ink take surface were in the range 2 to 10 poises and were applied by a reverse roll coater or by a device incorporating a wire wound doctor bar, to give dry coating thicknesses in the range 0.1 to 0.5 thousandth of an inch. In all these examples the film base used was biaxially oriented polyethylene terephthalate film. Hence the examples only recite the coatings applied to the film base.

EXAMPLE 1

*First coat.*—A dilute solution as follows:

| | | |
|---|---|---|
| A soluble copolyester (Vitel PE200) | g | 2.0 |
| Tetraisopropyl titanate | ml | 0.10 |
| Methylene chloride | ml | 100 |

Seasoned for 15 minutes at 105° C.

*Second coat.*—A lacquer of composition as follows:

| | | |
|---|---|---|
| Cellulose nitrate (H200) | g | 4.5 |
| Paralac 2001 (solid) | g | 8.9 |
| Paralac 285X | g | 4.5 |
| Gasil 64 | g | 3.1 |
| Runa RH20 | g | 0.20 |
| Zinc chloride | g | 0.3 |
| Industrial methylated spirits | g | 8 |
| Methyl ethyl ketone | g | 40 |
| Methyl Cellosolve | g | 22 |
| Xylene | g | 9 |

Seasoned for 15 minutes at 105° C.

EXAMPLE 2

*First coat.*—A dilute solution as follows:

| | | |
|---|---|---|
| A copolyester-amide containing 5 mole percent amide | g | 2.0 |
| Tetraisopropyl titanate | ml | 0.10 |
| Methylene chloride | ml | 100 |

Seasoned for 15 minutes at 105° C.

*Second coat.*—A lacquer as for Example 1:
Seasoned 15 minutes at 105° C.

The copolyester-amide of the first coat was composed of units derived from—

| | Mole percent |
|---|---|
| Terephthalic acid | 15 |
| Isophthalic acid | 35 |
| Ethylene glycol | 45 |
| Hexamethylene diamine | 5 |

EXAMPLE 3

*First coat.*—A dilute solution as follows:

| | | |
|---|---|---|
| A polyster-oxazoline containing 10 mole percent of oxazoline | g | 2.0 |
| Tetraisopropyl titanate | ml | 0.10 |
| Methylene chloride | ml | 100 |

Seasoned for 15 minutes at 105° C.

*Second coat.*—A lacquer as for Example 1:
Seasoned 15 minutes at 105° C.

The polyester-oxazoline of the first coat was composed of units derived from—

| | Mole percent |
|---|---|
| Terephthalic acid | 15 |
| Isophthalic acid | 35 |
| Ethylene glycol | 40 |
| 4,4–dihydroxymethyl 2-methyl oxazoline-2 | 10 |

EXAMPLE 4

*First coat.*—A dilute solution as follows:

| | | |
|---|---|---|
| Polyvinyl monochloracetate | g | 3.0 |
| Tetraisopropyl titanate | ml | 0.3 |
| Methylene chloride | ml | 100 |

Seasoned 15 minutes at 110° C.

*Second coat.*—A lacquer as for Example 1. Seasoned 15 minutes at 105° C.

EXAMPLE 5

*First coat.*—A dilute solution as follows:

| | | |
|---|---|---|
| Chlorinated polymethyl methacrylate | g | 2.0 |
| Methylene chloride | ml | 100 |

Seasoned for 15 minutes at 105° C.

*Second coat.*—A lacquer of composition as follows:

| | | |
|---|---|---|
| A copolymer | g | 2.4 | which comprises:

| | | |
|---|---|---|
| Methyl methacrylate | mole percent | 80 |
| Ethyl acrylate | do | 10 |
| Acrylamide | do | 10 |
| Gasil 64 | g | 6.0 |
| Methyl ethyl ketone | g | 45 |
| Toluene | g | 18 |
| Ethyl lactate | g | 7 |

(The chlorinated methyl methacrylate contained 44% chlorine by weight corresponding to a degree of substitution of 2.2.)

EXAMPLE 6

*First coat.*—A dilute solution as follows:

| | | |
|---|---|---|
| Epikote 1001 | g | 1.0 |
| Versamid 100 | g | 1.3 |
| Methylene chloride | ml | 100 |

Seasoned for 15 minutes at 110° C.

*Second coat.*—A lacquer of composition as follows:

| | G. |
|---|---|
| Epikote 1004 | 4.5 |
| Versamid 115 | 4.5 |
| Gasil 64 | 3.6 |
| Tioxide R-CR3 | 0.20 |
| Methylene chloride | 87 |
| Methyl cyclohexanone | 10 |

Seasoned 60 minutes at 110° C.
This lacquer was applied by bead coating.

EXAMPLE 7

*First coat.*—A dilute solution as for Example 1.

*Second coat.*—A dilute solution as follows:

| | | |
|---|---|---|
| Cellulose nitrate (H65) | g | 2.4 |
| Methanol | ml | 96 |
| Tetraisopropyl titanate | ml | 0.17 |
| Isopropanol | ml | 0.8 |
| Ethyl lactate | ml | 3.0 |

Seasoned 15 minutes at 105° C.

*Third coat.*—A lacquer as for second coat of Example 1. Seasoned 15 minutes at 105° C. The adhesion of the lacquer to the first coat was improved by having in this example the intermediate cellulose nitrate coat (second coat).

EXAMPLE 8

*First coat.*—A dilute solution as for Example 1.

*Second coat.*—A dilute solution as follows:

| | | |
|---|---|---|
| Texilac W602 DP | g | 4 |
| Catalyst W | g | 0.04 |
| Methanol | ml | 90 |
| Water | ml | 10 |

Seasoned 15 minutes at 80° C. and 50 minutes at 105° C.

*Third coat.*—A lacquer as for the second coat of Example 1. Seasoned 15 minutes at 105° C. Adhesion of the lacquer to the first coat was improved by having in this example the intermediate acrylic acid copolymer coat.

EXAMPLE 9

*First coat.*—A dilute solution as for Example 1.
*Second coat.*—A dilute solution as for Example 7.
Seasoned 15 minutes at 105° C.

*Third coat.*—A lacquer of composition as follows:

| | G. |
|---|---|
| Cellulose acetate (HAV) | 10.0 |
| Santocel 54 | 3.0 |
| Acetone | 61 |
| Ethyl lactate | 26 |

Seasoned 15 mniutes at 105° C.

EXAMPLE 10

*First coat.*—A dilute solution as for Example 1. Seasoned 30 minutes at 110° C.

*Second coat.*—A lacquer of composition as follows:

|   | G. |
|---|---|
| Cellulose nitrate | 7.5 |
| Bedacryl 3X | 15 |
| Paralac 285X | 7.5 |
| Gasil 64 | 5.6 |
| Industrial methylated spirits | 5 |
| Methyl ethyl ketone | 34 |
| Xylene | 25 |

Seasoned 30 minutes at 110° C.

EXAMPLE 11

*First coat.*—A dilute solution as for Example 1. Seasoned 30 minutes at 110° C.

*Second coat.*—A lacquer of composition as follows:

|   | G. |
|---|---|
| Cellulose nitrate (H65) | 7.5 |
| Pioneer FM555 (solid) | 15.0 |
| Paralac 285X (solid) | 7.5 |
| Gasil 64 | 5.6 |
| Industrial methylated spirits | 6 |
| Methyl ethyl ketone | 38 |
| Xylene | 20 |

Seasoned 30 minutes at 110° C.

EXAMPLE 12

*First coat.*—A dilute solution as for Example 2. Seasoned 10 minutes at 105° C.

*Second coat.*—A lacquer of composition as follows:

|   | G. |
|---|---|
| Formvar 770 | 16.0 |
| Gasil 64 | 4.0 |
| Toluene | 48 |
| Ethanol | 32 |

Seasoned 15 minutes at 105° C.

EXAMPLE 13

*First coat.*—A dilute solution as for Example 1. Seasoned 15 minutes at 105° C.

*Second coat.*—A lacquer of composition as follows:

| A copolymer | g | 23.5 |
|---|---|---|
| which comprises: |   |   |
| Methyl methacrylate | mole percent | 80 |
| Lauryl methacrylate | do | 10 |
| N-hydroxymethylacrylamide | do | 10 |
| Gasil 937 | g | 4.2 |
| Acetone | g | 6.8 |
| n-Butanol | g | 6.8 |
| Salicylic acid | g | 0.4 |

In all cases the coatings adhered strongly one to the other and to the film base and the coated films had surfaces very suitable for marking with ink or pencil, these markings being easily erased several times without deterioration of the drafting quality of the surfaces.

It will be understood that the invention includes coated film base as hereinbefore defined, such coated film base having an additional coating thereon of a photographic silver halide emulsion or light sensitive diazo composition, and the method described for the production of such products.

We claim as our invention:

1. A translucent polyester film material which is receptive to clear legible marking with writing materials which consists essentially of:
   (1) A hydrophobic film of biaxially orientated synthetic linear polyester having superimposed thereon
   (2) a first layer coated directly thereon and being formed essentially of a polymeric material selected from the class consisting of a mixed terephthalic-isophthalic polyester of alkylene glycols containing 25 to 90% of the ester groups derived from isophthalic acid, polyester amides which are a condensation product of dicarboxylic acids comprising iso and terephthalic acids with an alkylene glycol and an alkylene diamine, polyester oxazolines, polyvinyl halogenoacetate, copolymers of vinyl halogenoacetate with monomers copolymerisable therewith, chlorinated polyalkyl acrylates, chlorinated polyalkyl methacrylates, chlorinated copolymers of alkyl acrylates with monomers copolymerisable therewith, chlorinated copolymers of alkyl methacrylates with monomers copolymerisable therewith, and curable epoxy resins together with curing agents therefor, and
   (3) as an outer layer, a hydrophobic layer of an organic film-forming organic-solvent-soluble material containing finely divided discrete particles of an inorganic translucence-producing toothing agent.

2. A translucent polyester film material according to claim 1 which includes between said first layer and said outer layer a layer of nitrocellulose.

3. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of a mixed terephthalic-isophthalic polyester of at least one alkylene glycol in which 25 to 90% of the ester groups are derived from isophthalic acid, and
   (3) as an outer layer a hydrophobic layer of an organic film-forming organic-solvent-soluble material containing finely divided discrete particles of an inorganic translucence-producing toothing agent.

4. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of a polyester-amide which is the condensation product of dicarboxylic acids comprising iso and terephthalic acids with alkylene glycol and alkylene diamine, the alkylene diamine comprising 5 to 30% of the total molar amount of glycol and diamine and the dicarboxylic acid including at least one of the isomers of phthalic acid other than phthalic acid itself, and
   (3) as an outer layer a hydrophobic layer of an organic film-forming organic-solvent-soluble material containing finely divided discrete particles of an inorganic translucene-producing toothing agent.

5. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of a polyester-oxazoline which is the condensation product of dicarboxylic acid with alkylene glycol and oxazoline, the oxazoline comprising 5 to 30% of the total molar amount of glycol and oxazoline and the dicarboxylic acid including at least one of the isomers of phthalic acid other than phthalic acid itself, and
   (3) as an outer layer a hydrophobic layer of an organic film-forming organic-solvent-soluble material containing finely divided discrete particles of an inorganic translucence-producing toothing agent.

6. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of, a polymer of a vinyl ester of a chloracetic acid, and
(3) as an outer layer a hydrophobic layer of an organic film-forming organic-solvent-soluble material containing finely divided discrete particles of an inorganic translucence-producing toothing agent.

7. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of an epoxy resin which is a condensation product of a diphenyl propane with epichlorhydrin and having an epoxy equivalent of 190–2000, together with a curing agent therefor, and
   (3) as an outer layer a hydrophobic layer of an organic film-forming organic-solvent-soluble material containing finely divided discrete particles of an inorganic translucence-producing toothing agent.

8. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of a mixed terephthalic-isophthalic polyester of at least one alkylene glycol in which 25 to 90% of the ester groups are derived from isophthalic acid, the said layer containing a cross-linking agent which is selected from the class consisting of tetraalkoxy titanium and tetraalkoxy zirconium, and
   (3) as an outer layer a hydrophobic layer of an organic film-forming organic-solvent-soluble material containing finely divided discrete particles of an inorganic translucence-producing toothing agent.

9. A translucent polyester film material which is receptive to clear and legible marking with writing materials which consists essentially of:
   (1) a hydrophobic film of biaxially orientated polyethylene terephthalate having superimposed thereon
   (2) a first layer coated directly thereon and being formed essentially of a polyester-amide which is the condensation product of dicarboxylic acids comprising iso and terephthalic acids with alkylene glycol and alkylene diamine, the alkylene diamine comprising 5 to 30% of the total molar amount of glycol and diamine, the said layer containing a cross-linking agent which is selected from the class consisting of tetraalkoxy titanium and tetraalkoxy zirconium, and
   (3) as an outer layer a hydrophobic layer of an organic film-forming organic-solvent-soluble material containing finely divided discrete particles of an inorganic translucence-producing toothing agent.

10. A translucent polyester film material which is receptive to clear and legible marking with writing materials which consists essentially of:
    (1) a hydrophobic film of biaxially orientated polyethylene terephthalate having superimposed thereon
    (2) a first layer coated directly thereon and being formed essentially of a polyester-oxazoline which is the condensation product of dicarboxylic acid with alkylene glycol and oxazoline, the oxazoline comprising 5 to 30% of the total molar amount of glycol and oxazoline and the dicarboxylic acid including at least one of the isomers of phthalic acid other than phthalic acid itself, the said layer containing a cross-linking agent which is selected from the class consisting of tetraalkoxy titanium and tetraalkoxy zirconium, and
    (3) as an outer layer a hydrophobic layer of an organic film-forming organic-solvent-soluble material containing finely divided discrete particles of an inorganic translucence-producing toothing agent.

11. A translucent polyester film material which is receptive to clear and legible marking with writing materials which consists essentially of:
    (1) a hydrophobic film of biaxially orientated polyethylene terephthalate having superimposed thereon
    (2) a first layer coated directly thereon and being formed essentially of a polymer of a vinyl ester of a chloracetic acid, the said layer containing a cross-linking agent which is selected from the class consisting of tetraalkoxy titanium and tetraalkoxy zirconium, and
    (3) as an outer layer a hydrophobic layer of an organic film-forming organic-solvent-soluble material containing finely divided discrete particles of an inorganic translucence-producing toothing agent.

12. A translucent polyester film material which is receptive to clear and legible marking with writing materials which consists essentially of:
    (1) a hydrophobic film of biaxially orientated polyethylene terephthalate having superimposed thereon
    (2) a first layer coated directly thereon and being formed essentially of a polymeric material selected from the class consisting of mixed terephthalic-isophthalic polyesters of alkylene glycols in which 25 to 90% of the ester groups are derived from isophthalic acid, polyester amides which are a condensation product of dicarboxylic acids comprising iso and terephthalic acids with an alkylene glycol and an alkylene diamine, polyester oxazolines, polyvinyl halogenoacetate, copolymers of vinyl halogenoacetate with monomers copolymerisable therewith, chlorinated polyakyl acrylates, chlorinated polyalkyl methacrylates, chlorinated copolymers of alkyl acrylates with monomers copolymerisable therewith, chlorinated copolymers of alkyl methacrylates with monomers copolymerisable therewith, and curable epoxy resins together with curing agents therefor, and
    (3) as an outer layer a hydrophobic layer consisting essentially of at least one polymeric substance selected from the class consisting of cellulose esters, acrylic polymers and copolymers, organic-solvent-soluble urea-formaldehyde, modified urea-formaldehyde, melamine-formaldehyde and modified melamine-formaldehyde resins, alkyd resins, polyvinyl acetals, epoxy resins and soluble polyamide resins, the said layer containing finely divided discrete particles of an inorganic translucence-producing toothing agent.

13. A translucent polyester film material which is receptive to clear and legible marking with writing materials which consists essentially of:
    (1) a hydrophobic film of biaxially orientated polyethylene terephthalate having superimposed thereon
    (2) a first layer coated directly thereon and being formed essentially of a polymeric material selected from the class consisting of mixed terephthalic-isophthalic polyesters of alkylene glycols in which 25 to 90% of the ester groups are derived from isophthalic acid, polyester amides which are a condensation product of dicarboxylic acids comprising iso and terephthalic acids with an alkylene glycol and an alkylene diamine, polyester oxazolines, polyvinyl halogenoacetate, copolymers of vinyl halogenoacetate with monomers copolymerisable therewith, chlorinated polyalkyl acrylates, chlorinated polyalkyl methacrylates, chlorinated copolymers of alkyl acrylates with monomers copolymerisable therewith, chlorinated copolymerisable of alkyl methacrylates with monomers copolymerisable therewith, and curable epoxy resins together with curing agents therefor, and
    (3) as an outer layer a hydrophobic layer consisting essentially of at least one polymeric substance selected from the class consisting of cellulose esters, acrylic polymers and copolymers, organic-solvent-soluble urea-formaldehyde, modified urea-formaldehyde, melamine-formaldehyde and modified melamine-formaldehyde resins, alkyd resins, polyvinyl acetals, epoxy resins and soluble polyamide resins, the said layer containing silica of particle size 0.1 to 15 microns.

References Cited

UNITED STATES PATENTS

| | | |
|---|---|---|
| 2,870,044 | 1/1959 | Blatz. |
| 2,964,423 | 12/1960 | Van Stappen _____ 117—76 |
| 2,999,016 | 9/1961 | Beeber et al. |
| 3,227,576 | 1/1966 | Van Stappen. |
| 3,307,966 | 3/1967 | Shoaf. |
| 3,309,222 | 3/1967 | Caldwell. |

WILLIAM D. MARTIN, *Primary Examiner.*

R. HUSACK, *Assistant Examiner.*

U.S. Cl. X.R.

117—34, 70, 76, 138.8